United States Patent

Hofmann et al.

[11] Patent Number: 5,898,388
[45] Date of Patent: Apr. 27, 1999

[54] ROLLING CONTACT BEARING WITH ROTATIONAL SPEED MEASURING DEVICE

[75] Inventors: Heinrich Hofmann, Schweinfurt; Rainer Breitenbach, Gochsheim; Harald Merklein, Schweinfurt; Peter Niebling, Bad Kissingen; Roland Langer, Schwanfeld; Josef Binder, Bremen; Marcus Weser, Hamburg, all of Germany

[73] Assignee: FAG Automobiltechnik AG, Germany

[21] Appl. No.: 09/042,328

[22] Filed: Mar. 13, 1998

[30] Foreign Application Priority Data

Mar. 13, 1997 [DE] Germany ............ 197 10 337

[51] Int. Cl.$^6$ .................................................. G08C 19/06
[52] U.S. Cl. ........................... 340/870.31; 340/870.3; 340/870.16; 384/446; 384/448; 310/168; 310/68 R
[58] Field of Search .................. 340/870.31, 870.32, 340/870.3, 870.17, 870.16, 682; 384/446, 448; 310/108, 68 R, 68 B, 68 C; 307/16

[56] References Cited

U.S. PATENT DOCUMENTS

| 4,688,951 | 8/1987 | Guers | 384/446 |
| 5,473,323 | 12/1995 | Kreft | 340/870.31 |
| 5,491,468 | 2/1996 | Everett | 340/870.31 |
| 5,525,848 | 6/1996 | Pinkerton | 310/68 R |
| 5,585,577 | 12/1996 | Lemoine | 384/448 |
| 5,744,720 | 4/1998 | Ouchi | 348/448 |
| 5,755,517 | 5/1998 | Nicot | 384/448 |
| 5,805,080 | 9/1998 | Lemoine | 340/870.16 |

Primary Examiner—Michael Horabik
Assistant Examiner—Albert K. Wong
Attorney, Agent, or Firm—Ostrolenk, Faber, Gerb & Soffen, LLP

[57] ABSTRACT

A rolling contact bearing with rotational speed measuring device, in particular a wheel bearing for motor vehicles for telemetric transmission of energy and signal between bearing and environment, insensitive to tolerances of the bearing and its surrounding parts, with simple and cost-effective construction and small dimensions. A first telemetry unit is integrated in the inter-ring seal. It comprises pulse transmitter, rotational speed sensor, telemetry electronics and a miniature coil, which is inductively coupled with a further telemetry unit, which is fitted axially outside the bearing, and which supplies the first telemetry unit with energy and receives its signals.

10 Claims, 3 Drawing Sheets

ROLLING CONTACT BEARING WITH
ROTATIONAL SPEED MEASURING DEVICE

BACKGROUND OF THE INVENTION

The invention relates to a rolling contact bearing with a rotational speed measuring device that uses telemetry from the wheel bearing.

Many rolling contact bearings require a device for detecting their rotational speed. The prior art shows wheel bearings of motor vehicles equipped with rotational speed detection, in order, for example, to derive the speed from the signals obtained and to use this for controlling an anti-lock braking system. These are intended to detect even low rotational speeds, and the sensor has to be positioned at a very small distance from the pulse transmitter wheel or from an encoder disk.

A rolling contact bearing having a pulse transmitter disk that is integrated into the seal between the rings of the bearing is disclosed in DE 37 35 070 A1. However, the sensor has to be arranged with a short air gap with respect to the sealing disk, since the signal strength decreases as the square of the distance.

German Offenlegungsschrift 19 11 513 also discloses a rotational speed measuring device in a rolling contact bearing, wherein the device is integrated into the seal of the bearing. In addition to the air gap problem already mentioned, this has the additional problem that an electrical plug-in connection or a cable has to be provided for the transmission of energy and data. However, both options present a considerable space requirement. In addition, plug-in connections close to the wheel are problematic from the points of view of reliability and being leak tight, and cables permanently fitted to the bearing considerably interfere during handling and installation of the bearing.

U.S. Pat. No. 4,688,951 also discloses a rolling contact bearing in which electric signals are intended to be transmitted without contact. In this case, a sensor arranged on the rotating bearing ring transmits electric signals to a receiver by capacitive or inductive field changes or in the form of radio waves. A battery or a miniature generator supplies the energy to the transmitter. However, this is complicated, susceptible to faults and expensive.

SUMMARY OF THE INVENTION

It is therefore the object of the invention to further develop a rolling contact bearing of the type mentioned above such that the recited disadvantages are avoided, having a simple and cost-effective construction and small dimensions, which enables transmission of energy and signals between the bearing and the environment which is insensitive to tolerances of the bearing and surrounding parts. It is intended to implement the invention with a miniaturized unit comprising pulse transmitter, rotational speed sensor and data transmission.

A first telemetry unit is integrated in the bearing seal. It comprises a pulse transmitter, rotational speed sensor, telemetry electronics and at least one miniature coil. A second telemetry unit, which can be fitted externally, outside the bearing, supplies the first telemetry unit with energy and receives signals from the first telemetry unit. This enables reliable rotational speed detection and transmission with a simple and miniaturizable construction. The coupling of the internal telemetry unit to the external telemetry unit is influenced as a function of the rotational speed sensor signals. The coupling behavior is in this case detected by the external telemetry unit.

The coil is advantageously an annular coil, enabling its installation without concern as to its position. In order to protect the first telemetry unit against overheating when it is being vulcanized in place in the seal, an insulating intermediate layer is provided.

Other features and advantages of the present invention will become apparent from the following description of the invention which refers to the accompanying drawings.

DESCRIPTION OF THE PREFERRED
EMBODIMENTS

Figure 1:
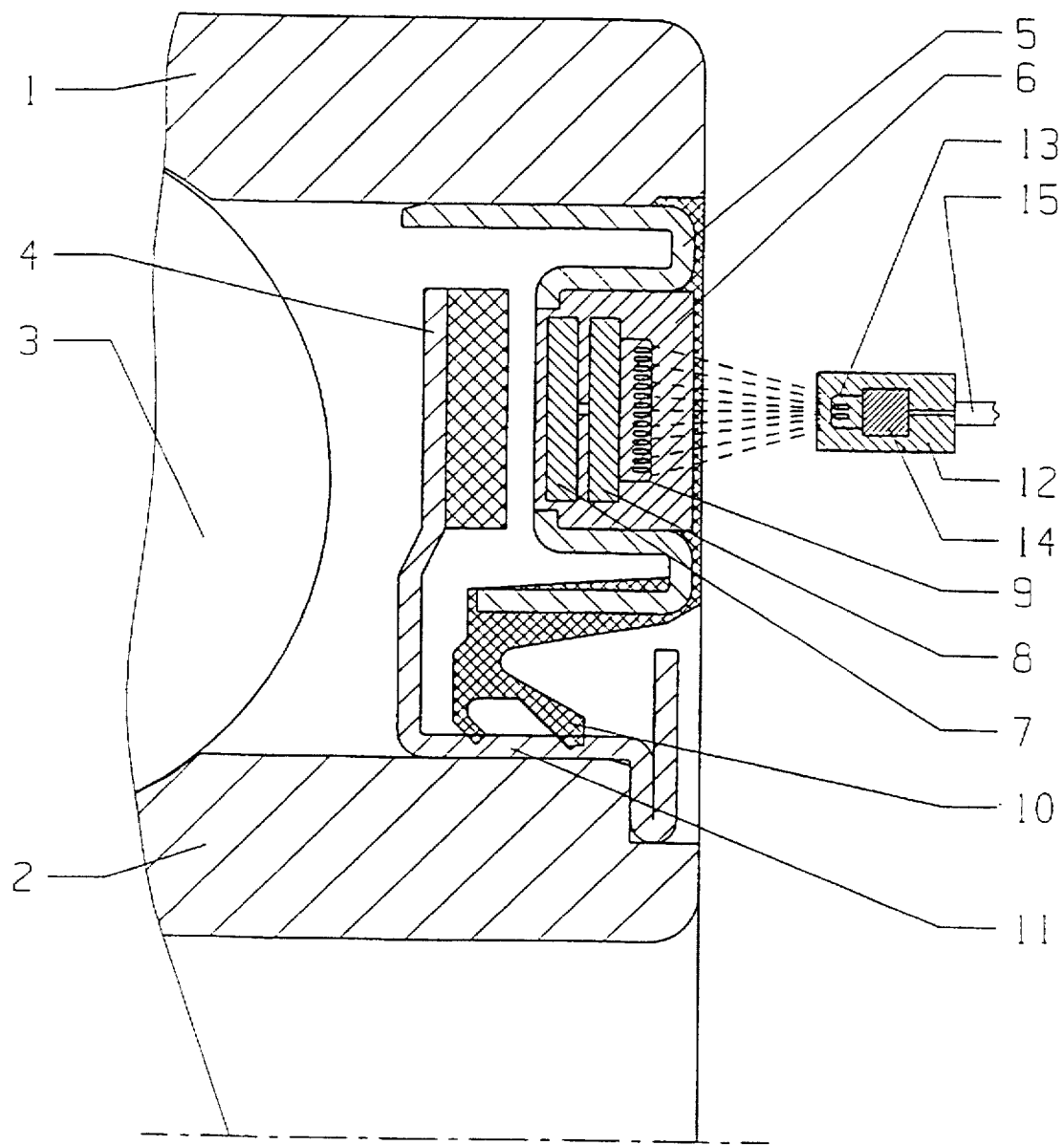
FIG. 1 shows a schematic, axial cross section, fragment of a bearing in which a first telemetry unit is integrated in a bearing seal and has a wire free connection via a coil to a second, external telemetry unit for the transmission of energy to and the reception of data from the first telemetry unit.

FIG. 1 shows a rolling contact bearing, including an outer ring 1, an inner ring 2, an annular row of rolling bodies 3 between the rings and an encoder disk 4 supported on and rotatable with the inner ring 2. The rolling bodies traveling in a row can be spaced from each other by a cage (not shown).

In this example, the inner ring 2 rotates along with an encoder disk 4 on the ring. The encoder disk 4 may have a simple design. It may be a perforated metal sheet and the passage of its perforations is sensed, or a corrugated metal sheet with corrugations that are sensed, or a toothed wheel with teeth that are sensed, or may be provided with spaced apart magnetic inlays.

A sealing disk 5 is arranged alongside the encoder disk 4. A first telemetry unit 6 is integrated in the disk 5. The unit 6 comprises a rotational speed sensor 7, telemetry electronics 8 (microchip) and a coil 9 which are conventional in spaced sensors. In addition, the sealing disk has flexible sealing lips 10, which run on a cylindrical attachment arm 11 of the encoder disk 4 to complete the seal radially between the inner and outer rings of the bearing.

A second telemetry unit 12, arranged axially outside the bearing, likewise has a coil 13 and telemetry electronics 14, which are supplied with electric energy via a cable 15. The telemetry electronics 14 include a tuned circuit, which is inductively coupled, via the coil 13, to the tuned circuit of the coil 9 and the telemetry electronics 8. Transmission of energy from the second telemetry unit 12 to the first telemetry unit 6 is caused by the tuned circuit of the telemetry electronics 14 exciting the tuned circuit of the telemetry electronics 8 at its resonance frequency, via the inductively coupled coils 13 and 9. Data as to the rotary speed signal is generated by the sensor 7 in cooperation with the encoder disk 4. That data is transmitted from the first telemetry unit 6 to the second telemetry unit 12 when the tuned circuit of the telemetry electronics 8 is detuned as a function of the sensor signal from the telemetry electronics 8, as a result of which the energy demand of the telemetry unit 6 changes (absorption modulation). The detuning of the tuned circuit can be caused, for example, by short circuiting, or attenuation of the coil 9 and/or a further microcoil. The deliberate detuning of the tuned circuit of the first telemetry unit 6 leads to a changed withdrawal of energy at the telemetry unit 12. The level of the withdrawal of energy can be measured by the telemetry electronics 14, and that is fed as a signal for further evaluation. There is a frequency of the transmission of energy from the second unit 12 to the first unit 6 and a carrier frequency of the transmission of data from the first unit 10 the second unit. It is preferred that the frequency of energy transmission be the carrier frequency for the data transmission, and that the frequency preferably lie in the megahertz range.

The coils of the two telemetry units are inductively coupled with the assistance of metallic parts of the bearing, including bearing parts, seal parts, flanges, axle pins, shafts, housing or other components adjacent the bearing.

Figure 2:
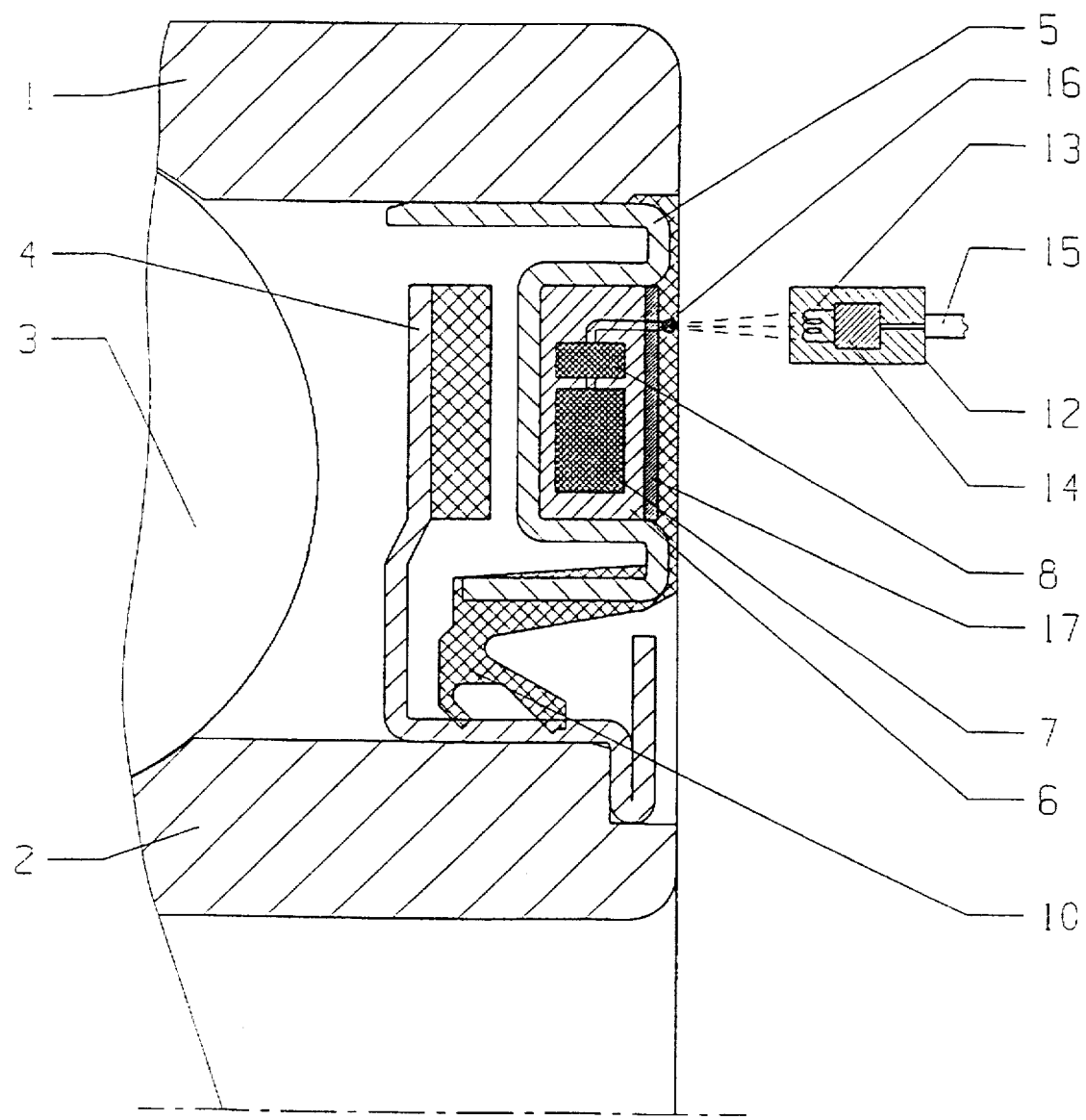
FIG. 2 shows a similar schematic fragmentary view of a bearing having a functional principle that corresponds to the arrangement illustrated in FIG. 1, but which includes an annular coil.
Figure 3:
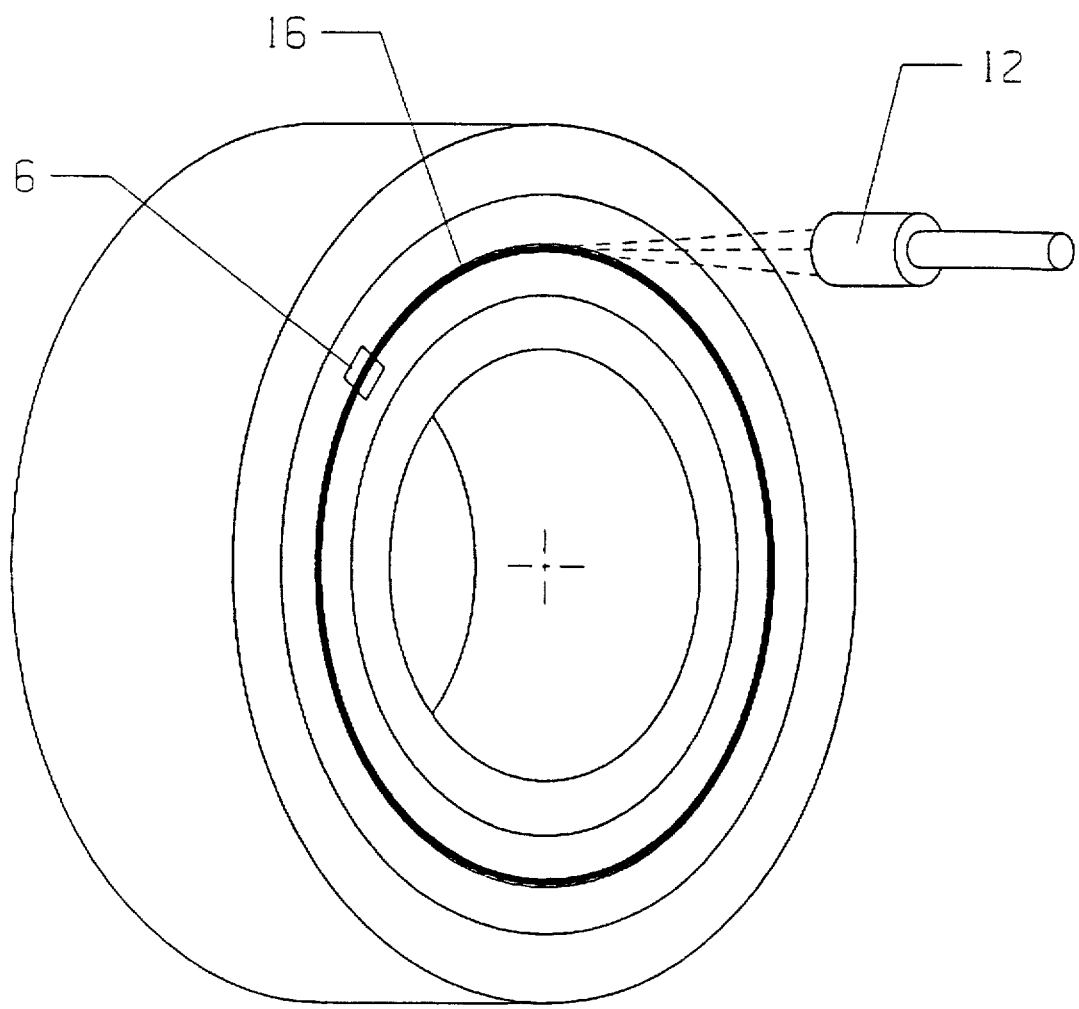
FIG. 3 shows a perspective view of the arrangement of FIG. 2.

FIGS. 2 and 3 illustrate an arrangement having a method of operation that corresponds to that of the arrangement shown in FIG. 1. However, the coil 16 has the form of an annular coil, which is preferably vulcanized into the sealing disk 5. As a result, precise adjustment of the two telemetry units in the circumferential direction is unnecessary. It is also possible to arrange the telemetry unit 6 on a rotating bearing part and to ensure the continuous transmission of energy and data to the telemetry unit 12 via the annular coil 16.

Using the arrangements indicated, and in contrast with conventional sensors, it is possible to provide a significantly greater distance between the external rotational speed detection and forwarding unit and the bearing. Whereas conventional air gaps normally have to be set on an order of magnitude of 0.5 to max. 3 mm, using the rolling contact bearing according to the invention it is possible to implement air gaps of over 5 mm. Here, modern chip design provides cost-effective and reliable components. The supply of energy and handling during transport and assembly present no problems, since cables or plugs are not necessary on either the stationary or on the rotating part of the rolling contact bearing.

Alternatively, the encoder disk or the transmitting and receiving device can be arranged radially or obliquely of the axis of the bearing and not only axially as shown. The encoder disk can also be integrated into the seal, or the cage or a bearing ring.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A rolling contact bearing having a rotational speed measuring device, the bearing comprising a bearing outer ring, a bearing inner ring inward of the bearing outer ring, and the rings being shaped as to have a gap between, the rings being rotatable relatively;

bearing rolling elements rolling between the outer and inner rings;

a seal toward an axial side of the bearing for sealing the gap between the rings;

the speed measuring device comprising a first telemetry unit in the seal and comprising a pulse transmitter connected with one of the relatively rotatable rings and telemetry electronics including an electric coil;

a rotation speed sensor connected with the other of the relatively rotatable rings, whereby the pulse transmitter and rotational speed sensor are relatively rotatable with respect to each other sensing the relative rotation of the bearing rings;

a second telemetry unit axially outside the bearing and axially away from the first telemetry unit, the second telemetry unit also including means therein for cooperating with the coil of the first telemetry unit for the second telemetry unit to supply the first telemetry unit with energy and for the second telemetry unit to receive signals from the first telemetry unit.

2. The rolling contact bearing of claim 1, wherein the coil of the first telemetry unit is an annular coil in the seal for enabling non-directional installation.

3. The rolling contact bearing of claim 1, wherein the first telemetry unit is vulcanized in the seal; an insulating intermediate layer axially outward of the telemetry unit at the seal for protecting the telemetry unit while it is being vulcanized therein.

4. The rolling contact bearing of claim 1, wherein both of the first and second telemetry units are selected so that the frequency of the transmission of energy is also the carrier frequency of the transmission of data.

5. The rolling contact bearing as claimed in claim 4, wherein the telemetry units are selected so that the frequency of the transmission of energy and the carrier frequency of the transmission of data are in the megahertz range.

6. The rolling contact bearing of claim 1, wherein the first and second telemetry units are adapted to the transmission of data using an absorption modulation method.

7. The rolling contact bearing of claim 1, wherein at least one of the rotational speed sensor, the telemetry electronics and the coil are integrated on an integrated circuit chip.

8. The rolling contact bearing of claim 1, wherein the first telemetry unit is vulcanized into the seal.

9. The rolling contact bearing of claim 1, further comprising metallic components associated with the bearing for inductively coupling the coil of the first telemetry unit and the second telemetry unit.

10. The rolling contact bearing of claim 1, wherein the first and second telemetry units are adapted to transmit rotational signals and in addition to transmit at least one of a temperature, tire pressure, forces and acceleration signals between the telemetry units.

* * * * *